United States Patent [19]
Neff et al.

[11] Patent Number: 5,835,883
[45] Date of Patent: Nov. 10, 1998

[54] METHOD FOR DETERMINING DISTRIBUTION OF RESERVOIR PERMEABILITY, POROSITY AND PSEUDO RELATIVE PERMEABILITY

[75] Inventors: Dennis B. Neff; Scott A. Runnestrand; Edgar L. Butler; Michael E. Vienot, all of Bartlesville, Okla.

[73] Assignee: Phillips Petroleum Company, Bartlesville, Okla.

[21] Appl. No.: 792,360

[22] Filed: Jan. 31, 1997

[51] Int. Cl.$^6$ ........................................ G06F 19/00

[52] U.S. Cl. ................... 702/7; 702/16; 702/12; 702/13

[58] Field of Search .................... 364/421, 422; 367/68–73

[56] References Cited

U.S. PATENT DOCUMENTS

| | | | |
|---|---|---|---|
| 4,679,174 | 7/1987 | Gelfand | 367/73 |
| 4,817,062 | 3/1989 | De Buyl et al. | 367/73 |
| 4,969,130 | 11/1990 | Wason et al. | 367/73 |
| 5,444,619 | 8/1995 | Hoskins et al. | 364/421 |
| 5,487,001 | 1/1996 | Neff | 364/421 |
| 5,563,949 | 10/1996 | Bahorich et al. | 364/421 |
| 5,583,825 | 12/1996 | Carrazzone et al. | 364/421 |
| 5,586,082 | 12/1996 | Anderson et al. | 364/421 |

OTHER PUBLICATIONS

U.S. Patent Application Serial No. 08/457,929, filed Jun. 1, 1995.

*Primary Examiner*—Donald E. McElheny, Jr.
*Attorney, Agent, or Firm*—George E. Bogatie

[57] ABSTRACT

A method and apparatus for predicting distribution of reservoir permeability or porosity and pseudo relative permeability using well data and 3-D seismic data are disclosed, where a preferred first step in the method models the reservoir property of interest to provide model logs which are expressible as continuous curves of a reservoir property as a function of depth. The next step selects individual data points on the continuous curves traversing a reservoir layer and determines permeable trends for a multitude of column-like subvolumes which each enclose a portion of the selected data points. The subvolumes are then divided into a desired number of horizontal slices, with each slice containing a number of the model data points. An average value for the property in each slice is calculated, and the average values are plotted versus depth for each subvolume, thus providing a derived curve of depth versus the reservoir property. The thus derived plots are compared with typical trend curves for layering in a reservoir, and the typical trend curve most nearly matching the derived plot is selected for representing the subvolume. A display of the subvolume trends demonstrates vertical distribution of the property in the reservoir, and can be used to direct the arrangement of pseudo relative permeability throughout a reservoir simulation model.

19 Claims, 10 Drawing Sheets
(1 of 10 Drawing(s) Filed in Color)

METHOD FOR DETERMINING DISTRIBUTION OF RESERVOIR PERMEABILITY, POROSITY AND PSEUDO RELATIVE PERMEABILITY

This invention relates to production of oil and gas from a subterranean reservoir, and more particularly to reservoir characterization in relation to porosity or permeability layering in subvolumes of a reservoir simulation process that predicts how hydrocarbons will flow in a reservoir.

BACKGROUND OF THE INVENTION

The usual goal of a seismic survey is to produce and display a model of the structure of subsurface layers within an area of interest. To accomplish the survey, an array of seismic sensors is laid out along a grid within the survey area, and an acoustic source is placed at a specific location in the vicinity of the sensor array. The source injects an acoustic signal into the earth which propagates downwardly into the earth and is partially reflected from various earth layers back to the surface, where the reflected signal is detected by the sensor array. The reflected signals detected by each sensor, which are recorded for later processing, are continuous electrical analog signals depicting amplitude versus time. The sensor array is then moved to a new position and the process repeated. When sufficient data has been acquired, the recorded analog signals from the sensors are converted to a digital format by sampling the signals at intervals such as every two milliseconds. Seismic data processing, which can be applied to single traces, is then performed using a digital computer. After processing, the data is reconverted to analog form and displayed as wiggle traces, or as a three-dimensional (3-D) volume of colored bands which more effectively represents a display of subsurface structural features.

While 3-D seismic data has been highly successful for the purpose of imaging seismic reflections, changes in reservoir petrophysical properties are difficult to detect on seismic reflection displays due to the limited amount of information that these properties provide in the reflected signal. Accordingly, using seismic data alone, it is difficult to identify important features relating to successful production of oil and gas from a reservoir, such as porosity and permeability in subsurface strata. It is also well known to employ depth-scale well logs, such as wireline well logs to accurately determine petrophysical properties associated with a subterranean formation of interest. Reservoir properties, which can be obtained from well logging or core sample operations include interval velocity, density, porosity, fluid saturation, lithological composition etc. Such well logs and core data, however, are very limited in areal extent, e.g., to about six to twelve inches around the borehole from which the measurements were taken. Since the petrophysical properties of a subterranean formation can vary widely at different locations in the same strata, such that analysis of data from multiple wells in an area may not correlate helpfully in predicting reservoir production, even in the same strata. For example, the same strata may be productive at one location and non-productive at a nearby location. This could be due to a number of different factors, however, a most likely factor is depletion of a hydrocarbon by migration to a different level.

If a well is located within the seismic survey area, depth-scale well logs of direct measurement may be made from which very detailed information becomes available from logs such as lithologic composition, porosity, density, and liquid saturation. From these logs, synthetic time-scale seismic traces may be computed. The synthetic trace is useful for demonstrating to the geophysicists what a seismic time-scale trace should be in the presence of the geologic conditions at or near the well. As used herein, a synthetic seismic trace is an artificial seismic signal developed mathematically from a model of subsurface strata and an assumed source. Accordingly, multiple synthetic traces can be developed by using petrophysical properties measured at the well as an initial model (or a reference point) and making desired perturbations to the measured subterranean properties at the initial model to obtain forward models which are representative of the lithology away from the borehole. This perturbation technique can be expanded to suggest lithologic models farther away from the borehole. Therefore, additional synthetic seismic traces, which are sometimes herein referred to as model traces, may be computed which typify a forward model, i.e., the lithology at some horizontal distance from the borehole.

While synthetic seismic traces may readily be calculated based on actual petrophysical or lithological data, or assumed perturbations to such data, these synthetic traces are subject to certain limitations. For example, a formation made up of a thirty-foot sand having a porosity of 15 percent, could produce the same seismic trace as a fifteen-foot thick sand having a porosity of 30 percent. Accordingly, a nonuniqueness of synthetic traces exists with respect to reservoir structure. In the past seismic/lithologic inversion techniques have either: (1) directly transformed a seismic trace into a pseudo log (usually sonic impedance) via some algorithm such as trace integration, deconvolution or solution of simultaneous equations, or (2) iteratively perturbed forward models on an individual trace basis until synthetic traces generated from them adequately matched the actual seismic data. Since both of these methods fail to address the nonuniqueness limitations of synthetic seismic traces with respect to reservoir acoustic impedance properties, confidence in the reservoir models based on these synthetic traces is lacking.

In the inverse case, from a recorded time-scale real seismic trace or a synthetic seismic trace, and assuming certain initial conditions, one can derive a depth-scale well log showing continuous petrophysical or lithological data for a well location corresponding to the seismic trace. Such a derived well log may be termed a pseudo log, and as used herein, a pseudo log is an artificial log of shaliness, porosity, fluid saturation, sonic, or density derived by inverting a seismic trace based on assumed petrophysical properties, or by perturbing petrophysical properties of an initial well log. While pseudo logs may be readily calculated based on a seismic trace, these pseudo logs are also subject to nonuniqueness in the lithologic/seismic inversion where the pseudo log is transformed into a seismic trace.

Since reservoirs produce oil and gas in relation in part to porosity and permeability, engineering field development strategies for production from a reservoir require detailed information about reservoir permeability and porosity and the depositional arrangement of porous and permeable layers. This data is desired in areal spacings of thirty to three-hundred feet, however, borehole penetrations, if present, are usually thousands of feet apart in reservoirs. 3-D seismic surveys take subsurface readings at areal spacings of tens of feet and so can help guide the creation of petrophysical maps if real seismic trace records can be converted to accurate subterranean models. Accordingly, a need remains to accurately convert the combination of petrophysical data and seismic data into detailed displays of subterranean petrophysical characteristics.

OBJECTS OF THE INVENTION

It is an object of this invention to more accurately predict the distribution of reservoir properties by modeling reservoir properties in relatively small volume simulation cells that are not coincident with well control.

A more specific object is to combine seismic data, petrophysical data and engineering data to better predict distribution of a reservoir property such as porosity.

A still more specific object is to improve accuracy in predicting a trend curve illustrating depth versus permeability or porosity for a reservoir layer.

Another object of this invention is to merge the independent knowledge of the geologist, geophysicists and the engineer into a method for assigning reservoir pseudo relative permeability areally and vertically through the reservoir.

A still further object is to provide a computer program which generates a high resolution image of subsurface distribution of depth v.s. porosity or permeability trend curves.

SUMMARY OF THE INVENTION

According to this invention the foregoing and other objects are attained by first modeling petrophysical properties of a reservoir layer of interest, and then modeling permeability and/or porosity of relatively small volume simulation cells in the reservoir that are not coincident with well control. The petrophysical model, which is required in the first step of the invention, relies on a basic data set including measured well log properties and a 3-D seismic data volume. While any suitable petrophysical model may be used in the first step of this invention, a forward modeling technique that recognizes and deals with nonunique inversion (NUI) of seismic/lithologic parameters, is preferred. This preferred model herein referred to as an NUI model, is initiated at the well site and predicts a relatively large number of NUI model logs that are expressible as continuous curves of a property as a function of depth throughout the reservoir, and at spacings corresponding to the seismic data. In the next step a number of possible general trend curves for permeability or porosity layer types are defined for later comparison to predicted profiles of the reservoir properties. Having information available in the form of continuous curves of reservoir properties at the relatively close spacing of seismic data, a large number of NUI model data points, which can be values of porosity, shaliness and /or permeability, are selected based on the continuous curves of the reservoir property. The selected NUI points are arranged as rows and laterally extending columns of points within the reservoir layer of interest. Next the NUI data points are partitioned into subvolumes referred to herein as reservoir model cells, which are columns traversing the layer with the cross section of the column defined by a lattice overlay on the upper surface of the layer of interest. The reservoir model cells are then divided into a desired number of horizontal slices and an arithmetical average of the NUI points is calculated for each slice. Plotting of the average values of porosity or permeability versus depth of the slices produces a depth versus porosity or permeability trend curve which can be statistically analyzed to define the type of general curve shape that is most closely represented by the plot of porosity or permeability distribution of the reservoir model cell. A map presentation showing the general curve type for each cell is then constructed by assigning colors to each of the of the general curve types.

Also provided is an output file consisting of a range of integer values where each integer value corresponds to one general curve shape, and only one value assigned to each reservoir model cell. As each assigned value corresponds to a unique porosity or permeability trend with depth, it is possible to correlate each trend with a corresponding pseudo relative permeability curve which has been calculated for such a variation. As used herein a pseudo relative permeability is the set of water—oil or gas—oil relative permeabilities which when used in a reservoir simulation model comprised of only one layer yields comparable performance characteristics to those obtained if the layer had been subdivided several times to reflect permeability and/or porosity variation with depth.

A method for assigning pseudo relative permeability curves to the general curve shape is disclosed in an article "New Pseudo Functions to Control Numerical Dispersion", Kyle, J. R. and Berry, D. W., SPEJ, (August 1975), 269–276, the disclosure of which is incorporated hereby reference.

In accordance with another aspect of this invention, apparatus comprises a computer programmed to carry out the above described method. In yet another aspect, a program storage device comprises a computer readable medium having computer program code embodied therein for causing the computer to carry out the above described method.

BRIEF DESCRIPTION OF THE DRAWINGS

The file of the patent contains at least one drawing executed in color. Copies of this patent with the color drawing will be provided by the Patent and Trademark Office upon request and payment of the necessary fee.

DETAILED DESCRIPTION OF THE INVENTION

The abundances of three-dimensional seismic data that is available, and the increased attention by geophysicists to reservoir characterization studies, have provided combinations of the basic data from which improved seismic inversion schemes can be applied. The basic data to which this invention is applied is in the form of a spacial sequence of seismic time scale traces, which have been recorded, stacked and properly migrated over a restricted time window as known in the art, and additionally includes lithological and petrophysical information from one or more wells located within the seismic survey area. Synthetic seismograms and pseudo logs can be computed from the basic data and then extended to pose numerous lithologic conditions which are likely to be found at forward model sites. Details of wavelet processing for producing synthetic seismograms, is disclosed with reference to FIG. 3 in U.S. Pat. No. 5,487,001 of Dennis Neff, filed May 28, 1993, the entire disclosure of which is incorporated herein by reference. Also explained with reference to the example in the incorporated disclosure are details of producing pseudo logs including lithologic ($V_{sh}$), saturation ($S_w$), porosity (ø), pay zone, sonic ($\Delta t$) and density ($\rho$).

In the preferred embodiment of this invention, a first step in NUI modeling of petrophysical properties is obtaining a 3-D seismic survey surrounding a well, along with lithological and petrophysical information from at least one well, for example, from well logs and coring operations. The method defines an initial lithological model at a reference well location which includes velocity and density logs derived by using petrophysical equations to integrate measured porosity, permeability, composition, and saturation logs into the velocity and density logs. The real seismic trace corresponding to the well location is associated with the initial model such that lithologic data is paired with the seismic data at the well site. Forward model perturbation techniques are then used to pair seismic and lithological data at the model sites.

The known petrophysical parameters of the respective formations at well locations are systematically perturbed and in this manner a large number of synthetic seismograms, or so called seismic model traces, is determined in order to build a catalog of synthetic traces of sufficient size that a range of lithologic and petrophysical parameters is included for each forward model site that bracket known conditions of the initial model.

Figure 1:
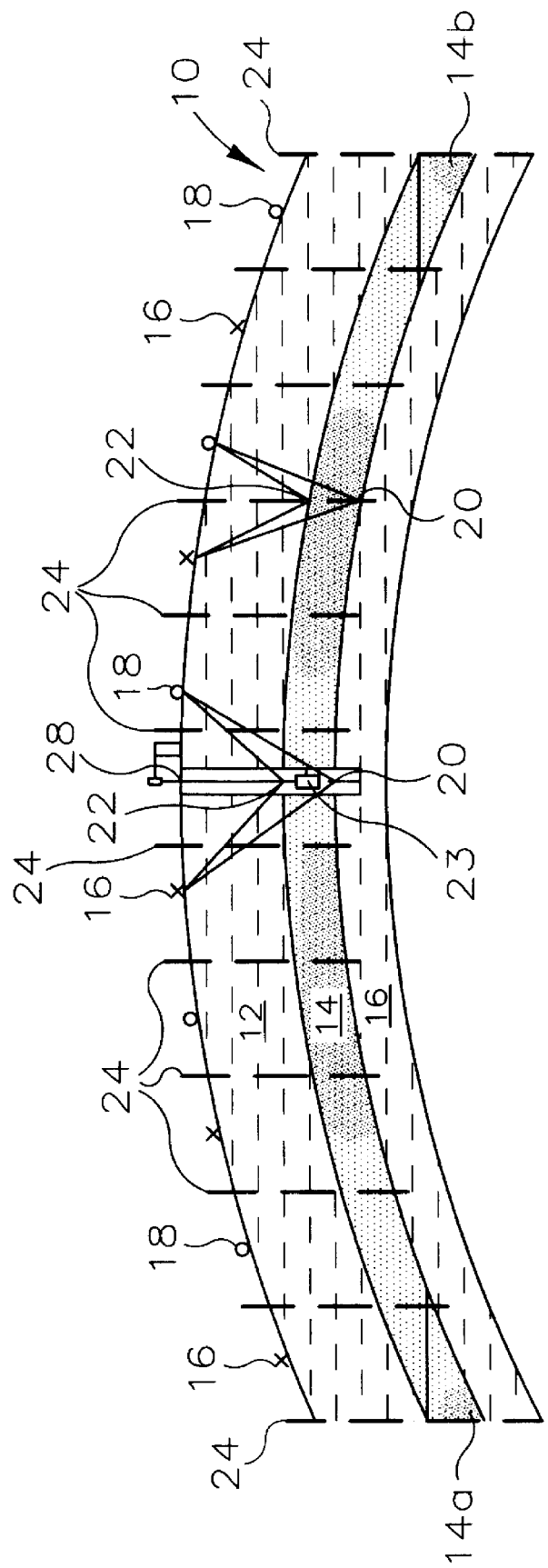
FIG. 1 is a generalized cross section of the earth showing seismic reflection points at a well and at forward model sites.

The various steps of the method of the invention will now be described in more detail with reference to a generalized hydrocarbon reservoir. Referring specifically now to FIG. 1, the earth surface 10 and the underlying cross section of the earth having multiple lithological layers, is illustrated. Examples of subsurface layers are illustrated at 12, 14, and 16. Layer 14 is illustrated as producing hydrocarbon from a well 28 at the center of the layer and, as illustrated, the layer 14 has water sections at 14(a) and 14(b). A 3-D seismic survey is carried out by positioning a grid of seismic sources, illustrated at 16, and seismic receivers such as shown at 18, which generate seismic traces reflected from the hydrocarbon layer 14 at points such as illustrated at 20 and 22. While only one set of reflection points away from the well is illustrated, it is to be understood that seismic traces reflected from each of the locations designated as 24 would include traces from an array of sources and receivers having a common mid points at each location 24. The locations 24 shown in FIG. 1 coincide with forward model sites. As used herein, a forward model site is the location of a vertical line traversing a subterranean layer, and which connects seismic reflection points from upper and lower boundaries of the layer. Also illustrated in FIG. 1, is a well logging tool 23 used to make various well logging measurements through the layer 14.

The first step is to obtain initial data which includes: (1) a 3-D seismic survey in the form of seismic signals reflected from subterranean points as illustrated in FIG. 3, and (2) well log data as illustrated in FIG. 4. Methods by which such seismic data and well log data is obtained and processed to useful forms is well known to those skilled in the art.

As previously mentioned, the initial data includes a lithological model at a reference well location 28 which is based on measured well data. The initial model includes a velocity and a density log derived by using petrophysical equations to integrate measured porosity, permeability, composition and fluid saturation into the velocity and density logs, and a real seismic trace which is paired with the initial well logs. Method by which such association can be accomplished is described in the previously incorporated reference.

Figure 2A:
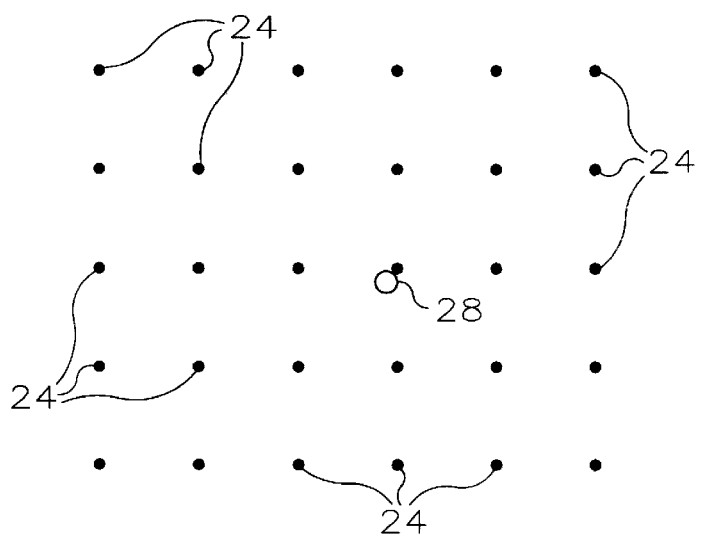
FIG. 2(a) is a plan view of FIG. 1 showing a well and surrounding model sites.
Figure 2B:
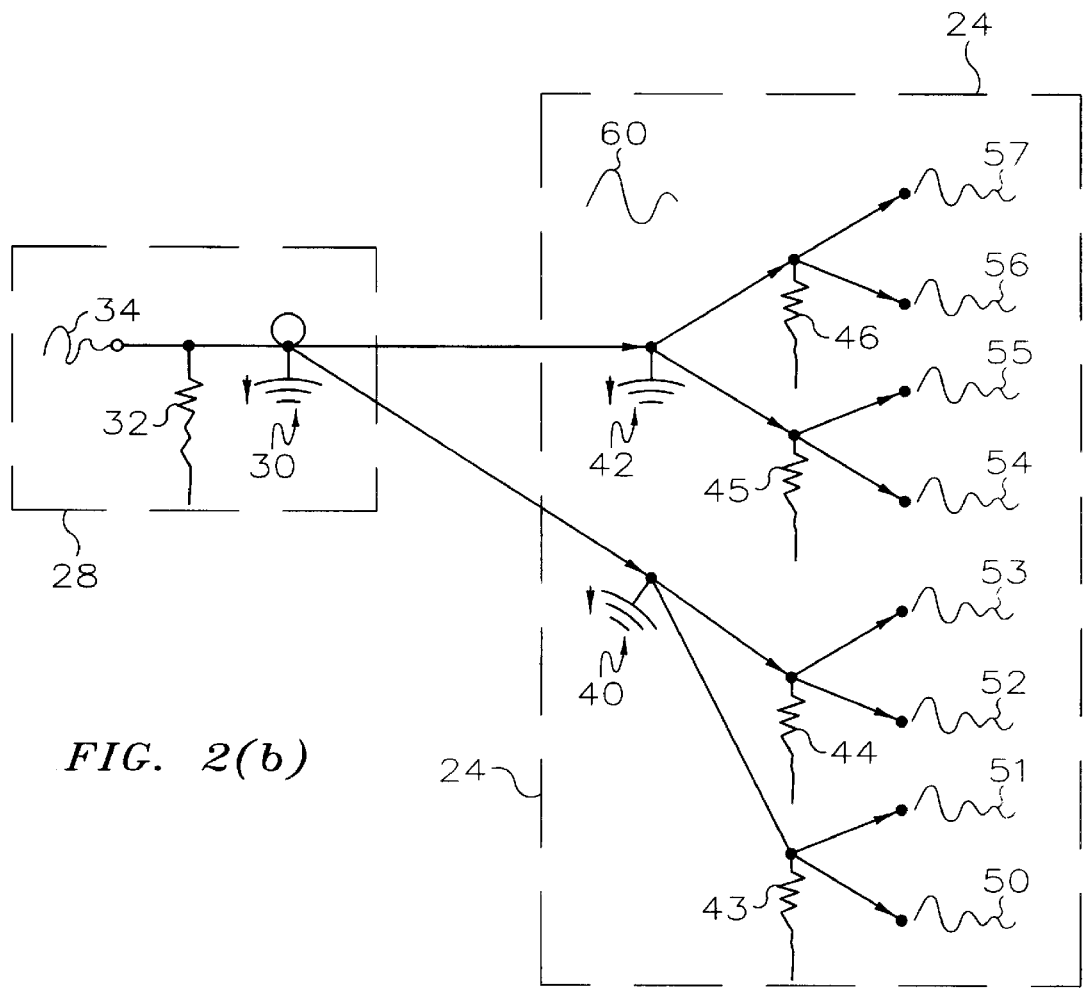
FIG. 2(b) is a schematic diagram illustrating petrophysical model development for one forward model site.

FIG. 2(a) is a plan view of a portion of the 3-D volume illustrated in FIG. 1, showing well 28 surrounded by seismic reflection points 24, which coincide with forward model sites. The forward modeling technique constructs a catalog of synthetic forward model traces. The technique is more clearly illustrated with reference to FIG. 2(b), which shows a well illustrated by the dash line 28 and a single forward model site illustrated by the dash line 24. The initial model at the well site 28 includes measured lithological conditions 30, a measured velocity and/or density log 32, which incorporates petrophysical parameters, and a real seismic trace 34. To obtain the forward model, the known conditions 30 at the initial site are perturbed to pose likely lithological conditions at the forward site 24. As illustrated, two conditions 40 and 42 are proposed, although it is recognized that any desired number of conditions could be proposed. For each proposed lithological condition a number of geologically feasible pseudo logs can be constructed for the model site 24. In FIG. 2(b), two pseudo logs are constructed for each proposed condition as illustrated at 43–46. Again, it is recognized that additional pseudo logs could be constructed if desired. Then for each pseudo log a number of synthetic seismic model traces are derived. In FIG. 2(b), two synthetic model traces are derived for each pseudo log as illustrated at 50–57, although more than two synthetic traces for each pseudo log could be included. Accordingly at each forward site, model elements include four attributes: a real seismic trace 60, at least two lithological conditions 40 and 42, at least four pseudo logs 43–46, and at least eight synthetic model seismic traces 50–57.

FIG. 4 shows a typical computer work station display for the suit of logs of interest in this invention including petrophysical parameters of shaliness ($V_{SH}$), saturation ($S_w$) and porosity ($\phi$), pay zone, sonic ($\Delta t$) and density ($\rho$), which are applicable to the present invention. Appropriate scales for the illustrated logs are marked on the horizontal axis, and the well depth in feet is indicated on the vertical axis. Also shown in FIG. 4 is the definition of a layer boundary for reflecting horizons indicating the cross section of volume which could be selected for detailed modeling according to this invention.

Parameters of interest for modeling include those which might indicate a subterranean layer containing hydrocarbons in sufficient quantity to justify commercial production such as layer thickness, shaliness, porosity, permeability, water saturation, etc. This is accomplished by association of a real seismic trace at a model location, such as trace 60 in FIG. 2(b), with the most likely of the several various petrophysical parameter proposed for the model site. Forward modeling is thus employed where perturbations in petrophysical properties are representative of probable and reasonable variations of the petrophysical property or properties of the initial model, without regard to analysis of real seismic traces at the forward model site.

Figure 3A:
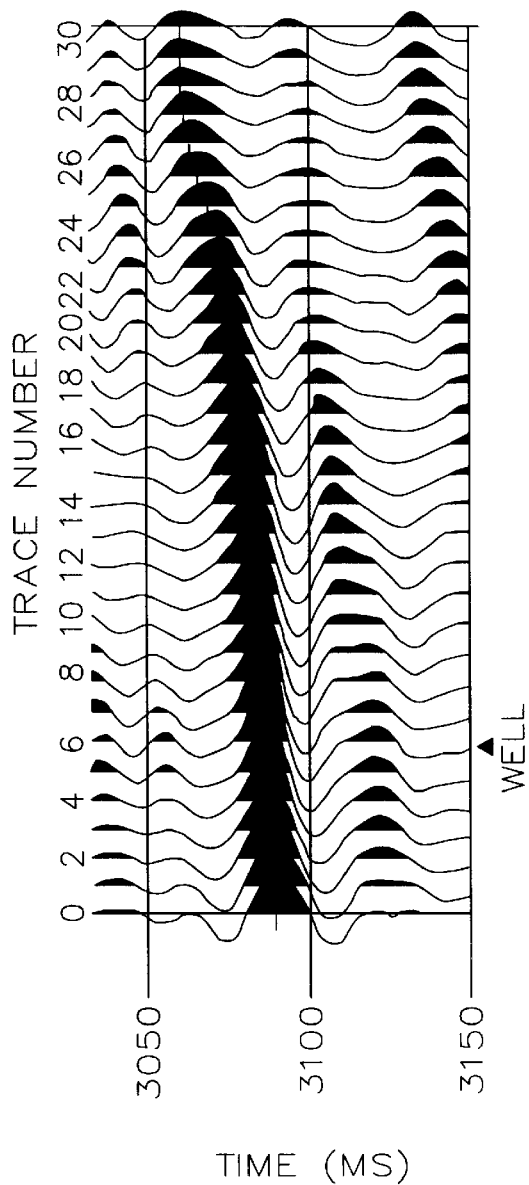
FIG. 3(a) is a typical seismic section.
Figure 3B:
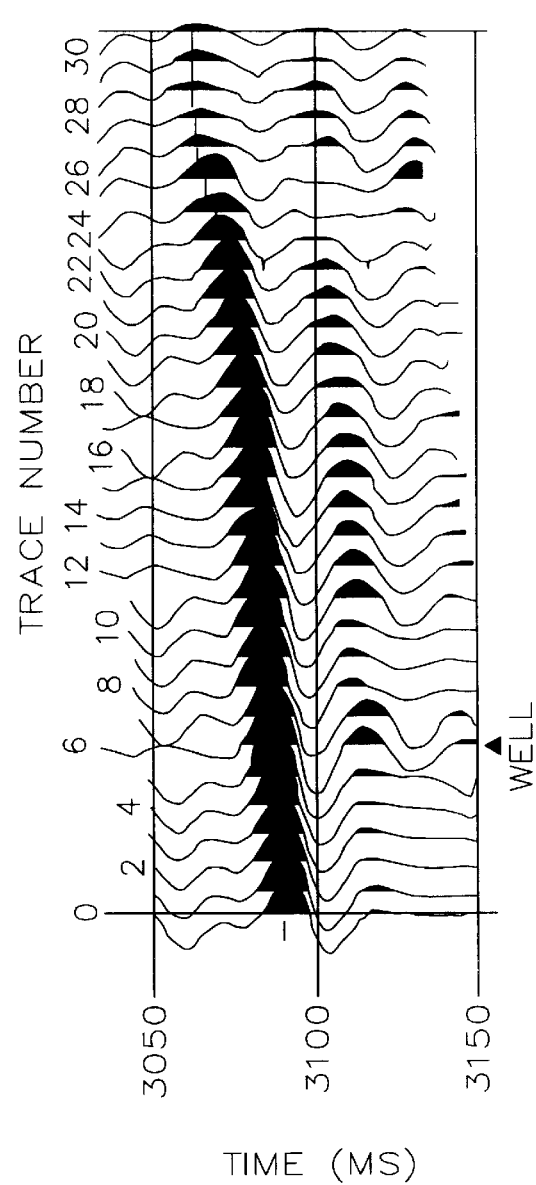
FIG. 3(b) represents synthetic traces corresponding to the seismic section of FIG. 1.
Figure 4:
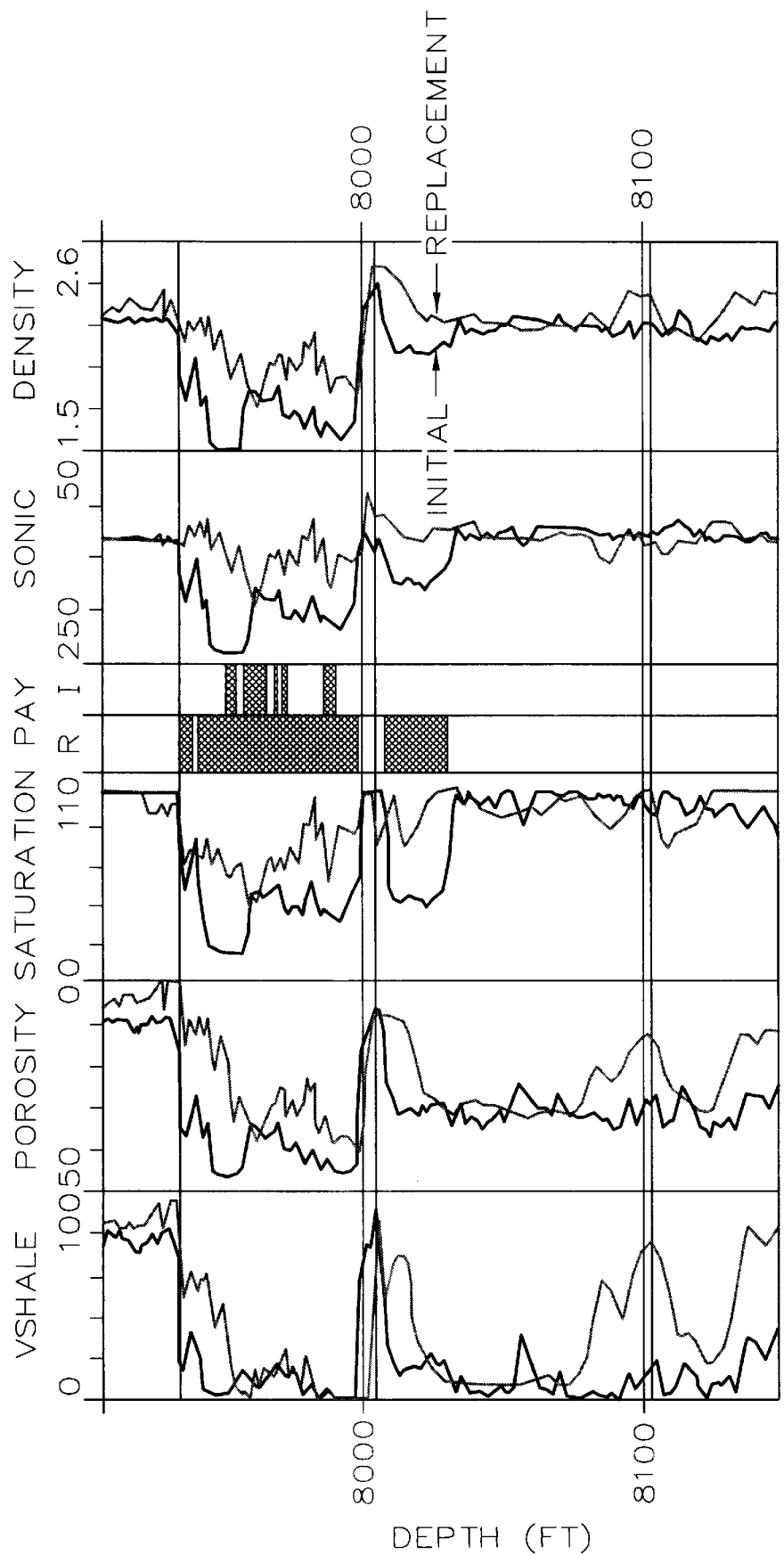
FIG. 4 illustrates a lithological well log suite pertinent to this invention.

Referring now to FIG. 3(a), there is illustrated a seismic section of recorded and processed seismic traces such as might be obtained from a cross section of earth illustrated in FIG. 1. FIG. 3(b) shows one set (of many possible sets), of corresponding model traces, which are synthetic model traces such as illustrated at 50–57 in FIG. 2(b), each of which synthetic traces is paired with a pseudo log and a petrophysical condition, also as illustrated in FIG. 2(b). Seismic station numbers 0–30 are indicated at the top of the section on the horizontal axis of FIG. 3, and intervals of two-way seismic travel time in milliseconds are marked on the vertical axis.

Figure 5:
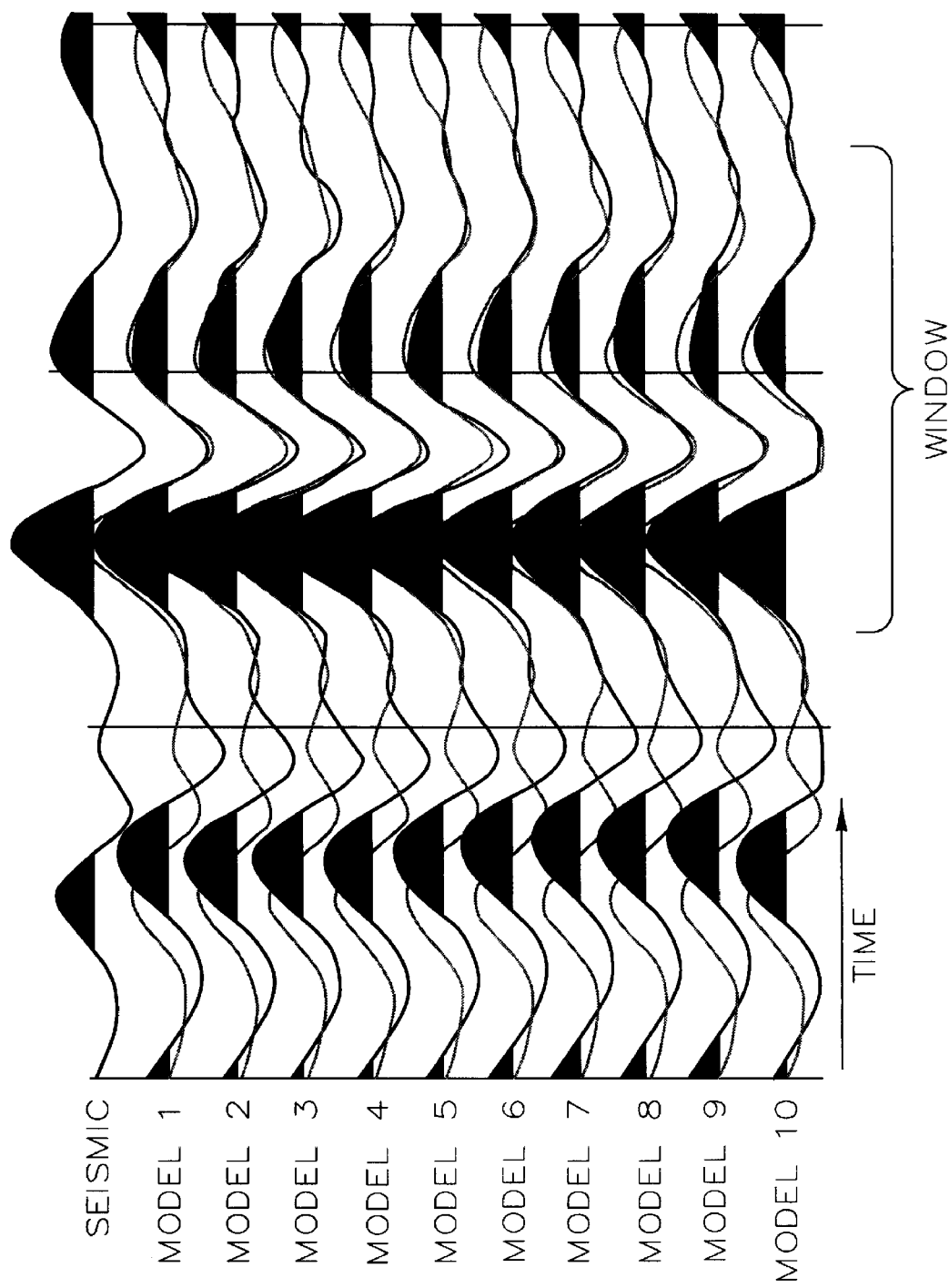
FIG. 5 illustrates comparison of a real seismic trace with 10 synthetic model traces.

The process of matching the catalog of synthetic seismic model traces to real traces is illustrated with reference to FIG. 5. This figure shows a comparison of a real seismic trace with ten synthetic model traces. A typical catalog of synthetic traces would include from about 1,000 to about 200,000 traces. As previously mentioned, however, a computer is used for comparing every synthetic forward model trace in the catalog with each real trace in the seismic survey, and several (e.g. 10 to 50) different synthetic seismic traces are selected for each forward model site which "best fit" the real seismic trace for the model site in some manner. The measure of similarity between synthetic and real traces includes a mathematical calculation of four factors. These factors include an absolute average difference factor, a so called RB factor, a cross correlation coefficient and a cross correlation lag, where any of these factors may be weighted depending, for example, on confidence in the basic data. The cross correlation technique is usually limited to a small time window of about thirty milliseconds (ms) to about one-hundred ms of the seismic trace, as illustrated in FIG. 5. This time window is adjusted to include the reservoir zone of interest plus any overburden or underburden zones that could influence seismic reflections. The selection method shown utilized two reference horizons, however, a single horizon which serves as the zero lag position for cross correlation operations and as a reference time for the positioning of pseudo logs may be employed. The seismic section data volume is relative amplitude and preferably zero phase.

Table I shows the numerical comparison of the ten selected "best fit" traces illustrated in FIG. 5, where all of the cross correlation coefficients are greater than 0.984; correlation lags are 3 or less; average absolute difference is 0.0104 or less and the RB factor is greater than 0.983. A cross correlation value of 1.0, with an average difference value of zero represents a perfect match. The most robust comparison of the model and real seismic traces occurs, however, when the cross correlation and absolute value differences are independently normalized to a scale of –1.0 to 1.0 and then ranked upon a combined value which is called the RB factor, which is shown in Table I. An RB factor of 1.0 represents a perfect match, and values less than 1.0 reflect progressively less similar waveforms.

TABLE I

Seismic Trace Comparison

| Model CDP | X-Corr Coefficient | X-Corr Lag | Avg abs Diff | RB-Factor |
|---|---|---|---|---|
| 1 | 0.9858 | 2 | 0.0100 | 0.9841 |
| 2 | 0.9903 | 2 | 0.0091 | 0.9885 |
| 3 | 0.9864 | 2 | 0.0104 | 0.9834 |
| 4 | 0.9855 | 2 | 0.0104 | 0.9830 |

TABLE I-continued

Seismic Trace Comparison

| Model CDP | X-Corr Coefficient | X-Corr Lag | Avg abs Diff | RB-Factor |
|---|---|---|---|---|
| 5 | 0.9843 | 3 | 0.0090 | 0.9858 |
| 6 | 0.9867 | 3 | 0.0089 | 0.9871 |
| 7 | 0.9841 | 2 | 0.0093 | 0.9850 |
| 8 | 0.9851 | 2 | 0.0088 | 0.9865 |
| 9 | 0.9852 | 2 | 0.0098 | 0.9842 |
| 10 | 0.9862 | 1 | 0.0080 | 0.9890 |

Figure 6:
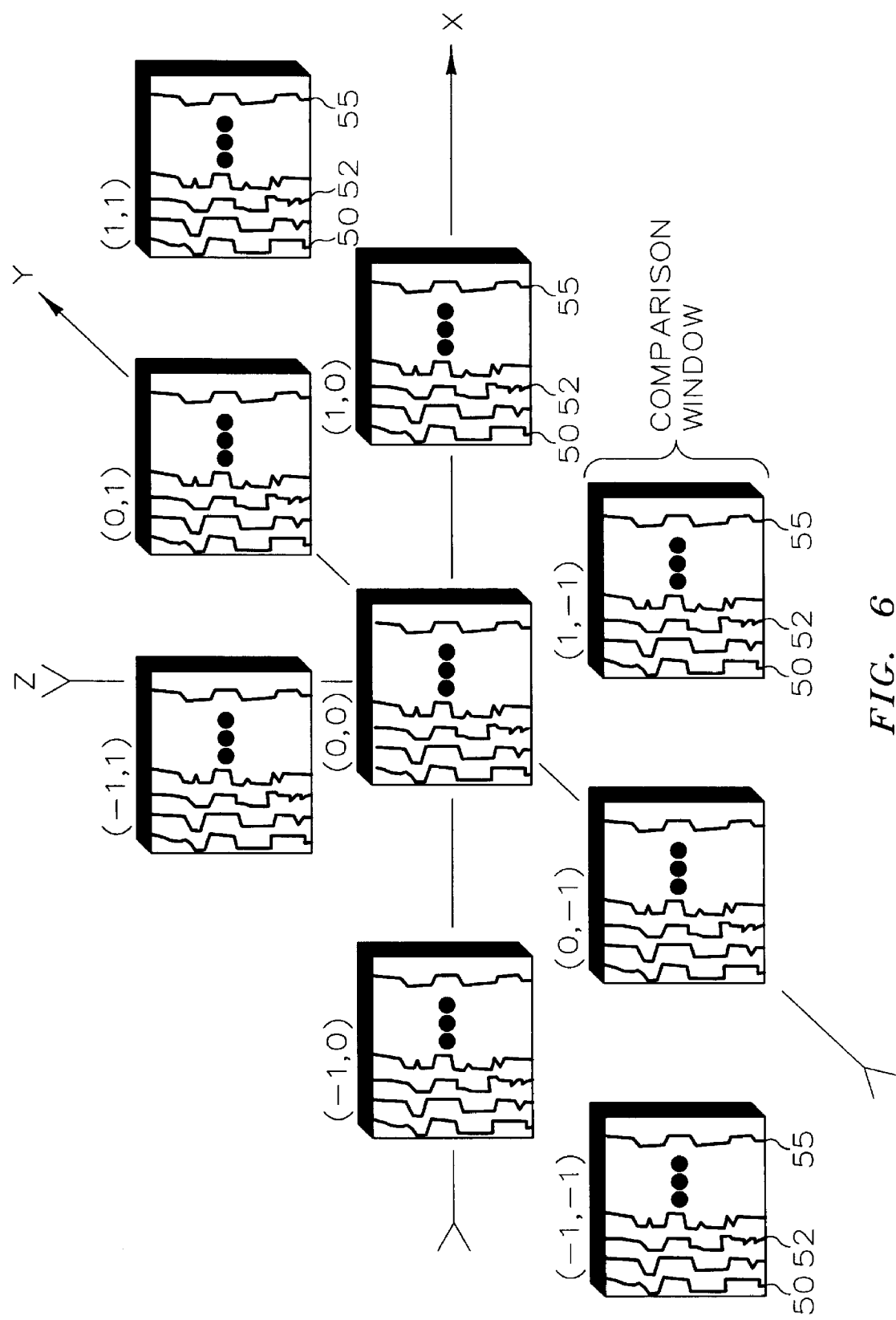
FIG. 6 is a pictorial drawing illustrating the coherence analysis scheme.

Many synthetic trace solutions can satisfy the real seismic data, for example, the ten model traces illustrated in FIG. 5 each satisfactorily match the real seismic trace. Since most of these matching synthetic traces cannot be ruled out as being paired with geologically unacceptable lithology at a model site, a coherent numerical analysis scheme is used to compare the pseudo logs, which are paired with the selected "best fit" synthetic traces with corresponding pseudo logs for adjoining sites. Referring now to FIG. 6, nine forward model sites are illustrated, within a volume to be modeled, where the sites are identified according to x and y coordinates shown by the numbers in parenthesis. A third axis labeled z is also shown which is indicative of time or alternately depth. For each model site, several pseudo log traces are illustrated, for example at reference numerals 50–55, which are the pseudo logs paired with the selected "best fit" synthetic seismic traces each model site. A numerical analysis scheme, as previously illustrated with reference to FIG. 5, compares pseudo logs for each site with pseudo logs for adjoining sites. For example pseudo logs associated with site location 0,0 are compared to corresponding pseudo logs for the eight surrounding sites. The numerical analysis then selects the single pseudo log for each model site that is most harmonious with it's geological surrounding and the selected pseudo logs are included in the NUI model. The numerical coherency scheme may take various forms. Whatever it's form, it's function is to compare similarity of petrophysical properties at adjacent sites. The scheme may include criteria such as: (a) which pseudo log i.e., porosity, permeability, impedance, etc., to compare, (b) the number of selected pseudo logs at each site, (c) the depth or time interval used for comparison; (d) quality of the seismic match; and (e) radial distance from the central location. Relative weighting factors may also be used in conjunction with the above criteria. For example, diagonal corner pseudo logs traces, such as 1,1 and –1,–1, are preferably weighted at 70 percent for selecting the central log. In general the same time window is used for coherent testing of pseudo logs and cross correlation of seismic traces.

The coherence matching scheme allows maps in three dimensional image model displays of subterranean volumes to have more geologically reasonable trends, while still maintaining high resolution of the seismic survey.

Figure 7G:
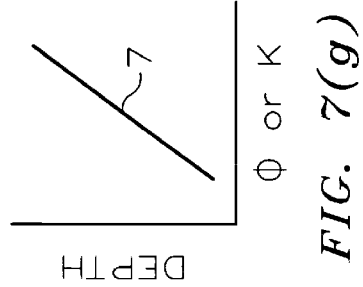
FIG. 7(a)–(g) is a diagram illustrating seven possible trend curves for depth versus porosity or permeability.
Figure 7C:
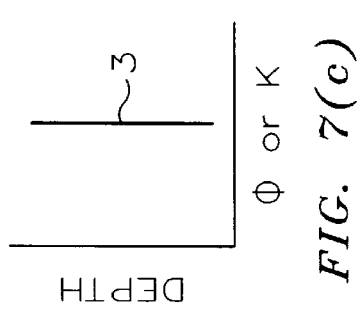
Figure 7F:
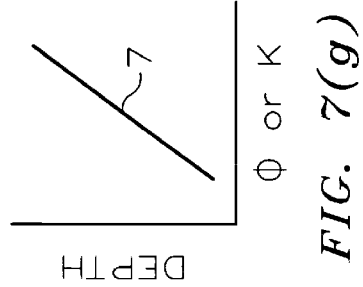
Figure 7B:
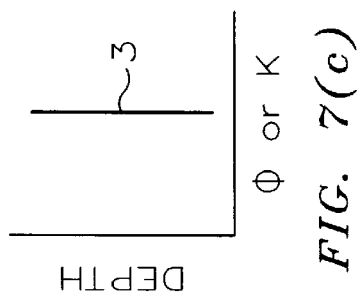
Figure 7E:
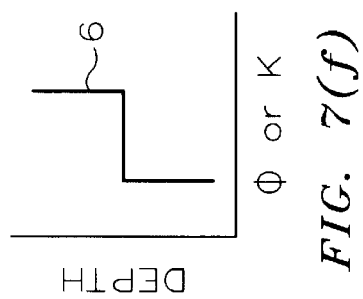
Figure 7A:
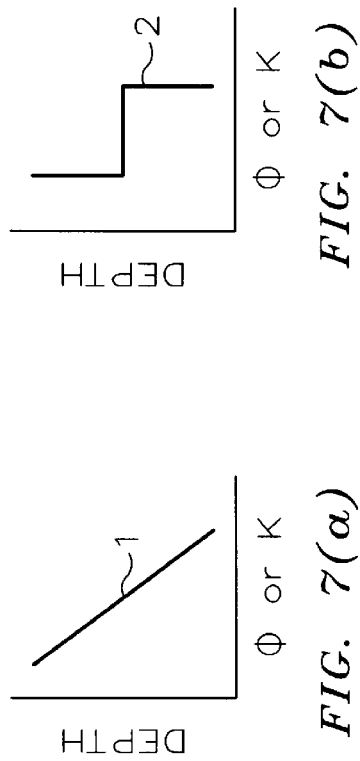

As previously mentioned reservoirs produce oil and gas in relation to porosity and permeability, and knowledge of a depth versus porosity or permeability trend curve between wells is important to characterization of the reservoir. Several general profiles of trend curves are illustrated with reference to a coordinate axis in FIGS. 7(a)–(g). For example, FIG. 7(a) illustrates a trend curve 1, of a consistently increasing permeability or porosity with depth, FIG. 7(b) illustrates a step type function 2 showing an abrupt increase in permeability or porosity with depth for the reservoir model cell, and FIG. 7(c) illustrates a trend curve 3 of constant permeability or porosity with depth. Other functional type curves illustrated at 4, 5, 6 and 7 in FIGS. 7(d) through (g) respectively are commonly found in reservoirs. As will be more fully explained hereinbelow, the possible layering types for comparison with NUI model data include, but are not limited to, the seven types illustrated in FIGS. 7(a)–(g).

Figure 10:
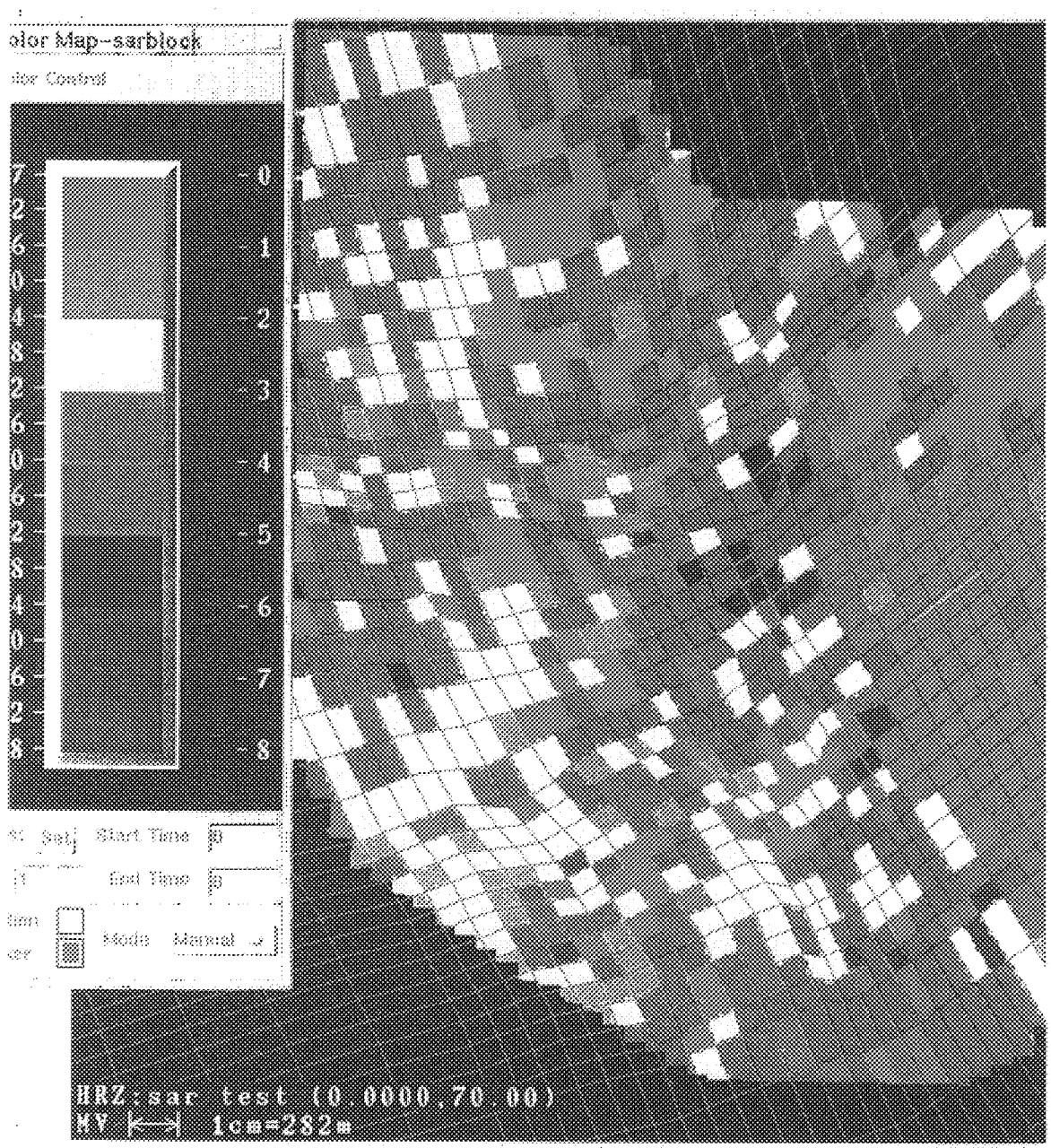
FIG. 10 is a computer generated color display of predicted areal distribution of various general curve shapes. One color being assigned to each general curve shape.

Having detailed information available in the form of continuous pseudo logs at the relatively close spacing of the seismic data, NUI data points for properties such as porosity, shaliness, or permeability are selected from the continuous model logs, and arranged in rows and columns throughout the volume of interest. This NUI data is then partitioned into subvolumes defined by reservoir model cells distributed over the volume of interest. The preferred method of partitioning the data into reservoir model cells is to use a lattice overlay for the upper surface of the layer as illustrated in FIG. 10, and then identifying NUI data points included in the interior region within each lattice opening.

Figure 7D:
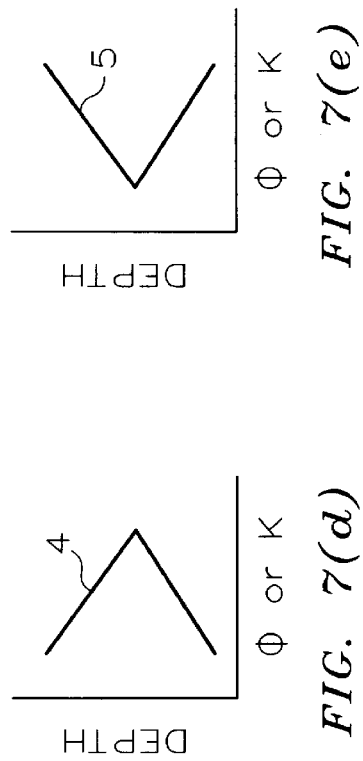
Figure 8B:
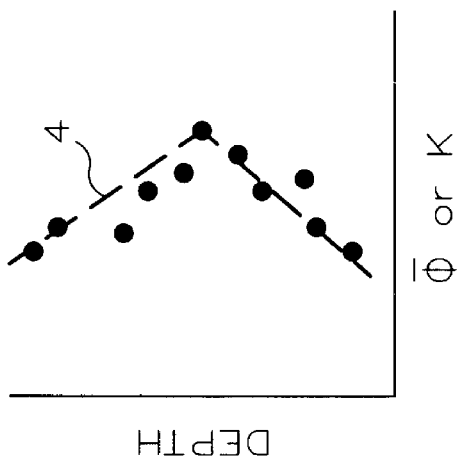
FIG. 8(b) is a graph of depth versus permeability for the reservoir model cell of FIG. 8(a).
Figure 8A:
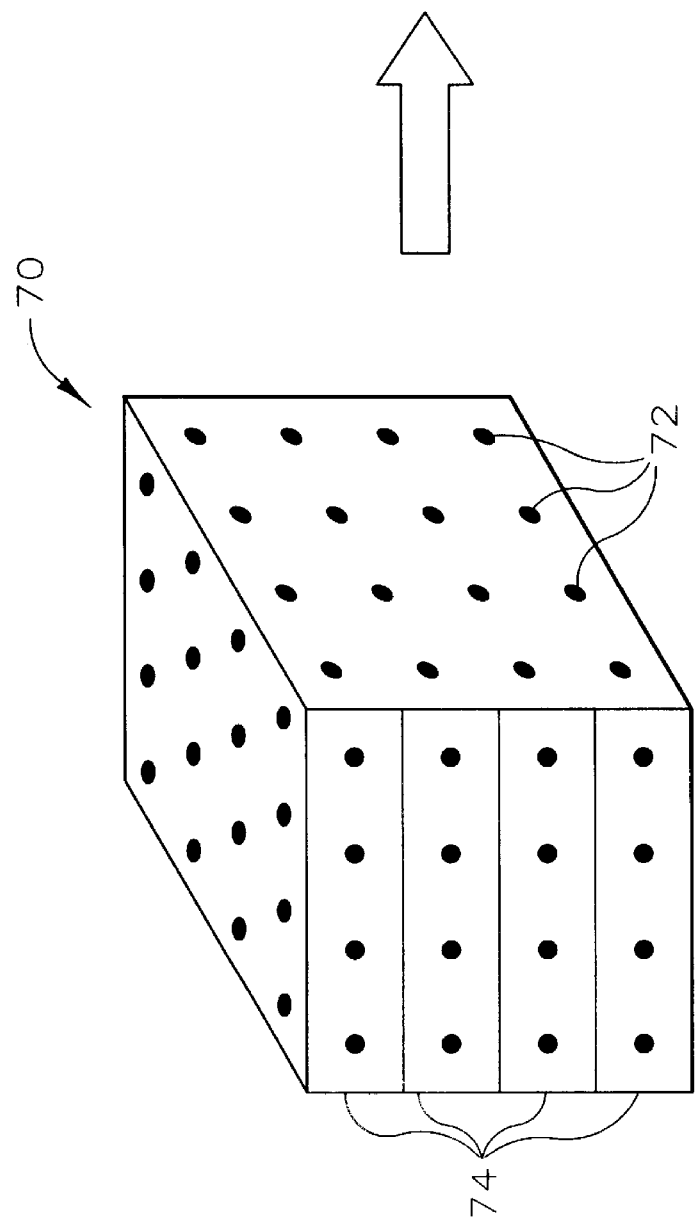
FIG. 8(a) is a perspective view depicting a reservoir model cell divided into four horizontal slices.

Referring now to FIG. 8(a), a reservoir model cell is generally indicated by the reference character 70, with a multitude of NUI data points 72 arranged in rows and columns within the reservoir model cell 70. Further illustrated in FIG. 8(a) is the division of the reservoir model cell 70 into four horizontal slices 74. It is recognized that reservoir model cell 70 could be divided into a greater number of slices, and in practice of the invention the cells are divided into a user specified number of slices, which are generally taken in five to ten feet increments. The data points included in each slice are then arithmetically averaged, and the average value is plotted versus depth to produce a depth versus porosity or permeability trend curve as illustrated in FIG. 8(b). The thus plotted trend curve, shown as a dashed line 4 in FIG. 8(b), is then compared with each of the typical trend curves illustrated in FIG. 7. Using a statistical analysis, preferably a least-squares error technique, the curve type of FIG. 7, which most nearly represents the curve of FIG. 8(b) is identified. As illustrated in FIG. 8(b) the curve type 4 of FIG. 7(d) is selected for association with the illustrated reservoir model cell 70.

Detailed pattern recognition techniques are also contemplated in this invention for assigning the most representative trend curve from FIG. 7 to each reservoir model cell. For example, referring to the curve type of FIG. 7(c), a statistical error for the mean value is computed, and this curve is always considered as a possible representative trend curve. Curve types illustrated in FIGS. 7(a) and (g) are tested by using simple linear regression with the sign of the slope differentiating and thus eliminating one type. Both FIGS. 7(a) and (g) type curves will be rejected if the slope of the regression is too small to influence pseudo relative permeability of the cell.

Next, types illustrated in FIGS. 7(b) and (f) are pattern tested by searching for a break point which shows an abrupt increase or decrease of the mean value of relative permeability or porosity with depth. Accordingly, if such a shift is found one of the types shown in FIGS. 7(b) and (f) will be eliminated depending on whether the change in porosity or permeability increased or decreased with depth. In use, the break point is constrained to be near the center of the cell and the shift must be of sufficient magnitude to influence pseudo relative permeability of the cell. Accordingly, one or both of curve types of FIGS. 7(b) and (f) may be eliminated.

The remaining two types, illustrated if FIGS. 7(d) and (e) are tested by searching for a depth break point which shows data points above the break point to have a slope of opposite sign to the data points below the break point. The sign of each slope will differentiate curve types shown in FIGS. 7(d) and (e). This break point is constrained to be near the center of the cell, and the slopes must meet some threshold criteria to properly influence pseudo relative permeability. Accordingly, one or both curve types of FIGS. 7(d) and (e) may be eliminated.

From the preceding pattern recognition technique, at least one curve type and possibly up to four types are considered as candidates for the representative trend curve, and the trend curve having the least statistical error is selected and assigned to each reservoir model cell.

Since each general trend curve is identified by an integer number, the above described pattern recognition technique produces an array of integer numbers where each integer value corresponds to one of the general curve shapes of FIG. 7(a)–(g). Only one value being assigned to each reservoir model cell. In one preferred embodiment of this invention each integer value is assigned a color, and the color is plotted to illustrate a color map presentation of the trend curves assigned to each reservoir model cell. In another preferred embodiment of the invention, a file consisting of the array of integer values is provided to the reservoir engineer. The reservoir engineer given the general porosity or permeability variation with depth, which each integer represents, can then directly correlate pseudo relative permeability curves, to each reservoir model cell in a reservoir simulation model, according to methods described in the previously incorporated reference of Kyle, J. R. et al. Thus providing the reservoir engineer very detailed relative permeability information for reservoir characterization.

As those skilled in the art can appreciate, the method of this invention requires a very large amount of detailed calculations, such as generating a catalog of synthetic traces, pseudo logs, and comparing real and synthetic seismic traces. Further processing includes averaging data values for a large number of slices containing the data points, comparing derived trend curves of reservoir properties with generalized trend curves, and generating color displays employing various shades and hues.

Figure 9:
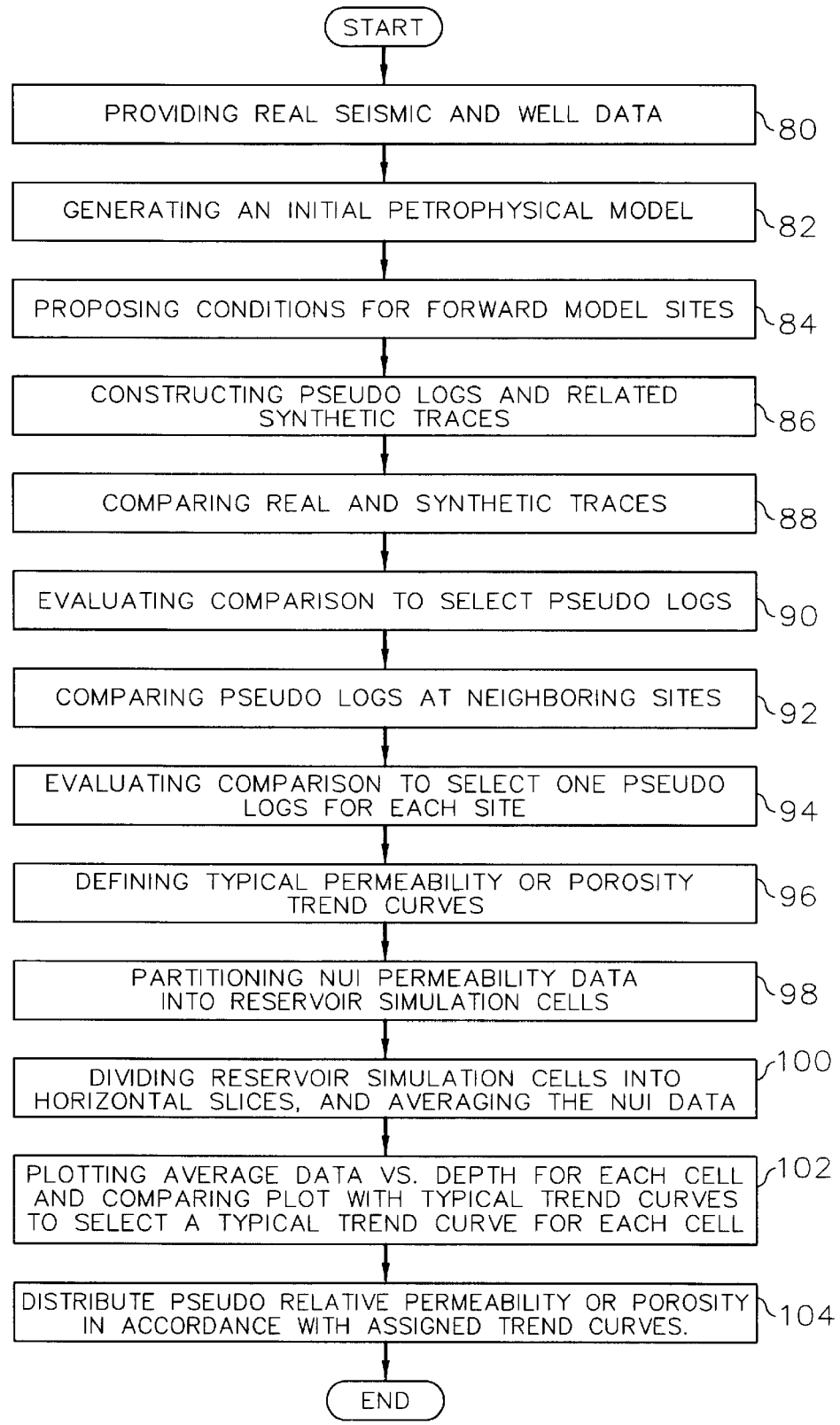
FIG. 9 is a simplified flow chart for computer implementation according to this invention.

Accordingly, FIG. 9 is a flow diagram for computer implementation of the process of this invention. In FIG. 9, initially as shown at 80, all seismic data and lithological data are assembled to provide the required basic data. At step 82 an initial model is generated that includes petrophysical parameters pertinent to the desired result. Initial lithological data is then perturbed to propose plural petrophysical properties at forward model sites, as expressed in block 84. For each proposed petrophysical property plural pseudo logs are calculated and associated with the model site, and a plurality of synthetic seismic traces are calculated for each of the proposed pseudo logs at step 86. The next step 88 involves comparing real seismic traces with the calculated synthetic traces to identify at least several synthetic traces that best match a real seismic trace in some manner. Next at step 90, plural pseudo logs, which are associated with the identified synthetic traces, are coupled with each model site. Plural pseudo logs at each model site are compared to neighboring sites at step 92, and based on this comparison a single pseudo log is selected as a model log for each forward site at step 94.

In step 96 at least seven porosity or permeability trend curves are defined that are representative of possible layering types in reservoirs. These trend curves are retained for comparison with computed curves of reservoir permeability or porosity. Next as expressed in step 98, the NUI porosity or permeability data points are partitioned into reservoir model cells. These reservoir model cells are then divided into horizontal slices, with each slice containing a set of data points at step 100. Further in step 100 an average value is calculated for the data points in each slice. Next, in step 102, a plot of the average data value for each slice versus depth is constructed, and this plot is compared to the typical trend curves defined in step 96, to select a representative curve for the reservoir model cell. Next in step 104 the selected curves can be color coded and the color for each cell can be plotted to illustrate a map presentation of the selected curves.

Referring specifically now to FIG. 10, what is illustrated is a plan view of one surface of a subterranean layer that is parallel to a geological layer. FIG. 10 is a computer generated color model of the subsurface layer using a number of colors to show areal distribution of various general curve shapes. This view includes a color code insert at the left-hand edge of the drawing which refers to the reference number of the curves shown in FIG. 7(*b*).

The invention as described and illustrated herein is an effective method and apparatus for characterizing areal and vertical reservoir porosity and permeability trends within a reservoir as well assigning pseudo relative permeabilities throughout the reservoir. However, those skilled in the art will recognize that many modifications and variations of the present invention are possible in light of the above teachings without departing from the invention. Such modification and variations might include using various other models for the petrophysical model required in the present invention. Accordingly it should be clearly understood that the present invention is not intended to be limited by the particular features described and illustrated in the drawings, but the concept of the present invention is to be measured by the scope of the appended claims.

That which is claimed is:

1. A computer implemented method for using both seismic data and well data for determining distribution of a reservoir property within a subterranean layer of a reservoir, wherein a petrophysical model of said reservoir property is derived from a basic data set including a three-dimensional seismic data volume, and well log data representative of structure and texture of said subterranean layer for at least one well location within said seismic volume, said method steps comprising:

(a) determining said petrophysical model of said reservoir, wherein said petrophysical model comprises a plurality of model logs of said reservoir property;

(b) defining a plurality of typical trend curves of depth versus said reservoir property for said subterranean layer;

(c) selecting a first plurality of model data points for said reservoir property based on said model logs, wherein said model data points are arranged in rows and laterally extending columns throughout said subterranean layer at spacing corresponding to said seismic data;

(d) partitioning said model data points into a plurality of reservoir model cells, wherein each of said reservoir model cells traverses said layer and encloses a second plurality of said model data points which is less than said first plurality;

(e) dividing each of said reservoir model cells into a desired number of horizontal slices, wherein each of said horizontal slices encloses at least two model data points of said second plurality of model data points;

(f) calculating an average value of said reservoir property in each of said horizontal slices, and plotting said average value versus depth for each of said reservoir model cells to define a derived trend curve for each of said reservoir model cells;

(g) comparing said derived trend curves of step (f) for each of said reservoir model cells with each of said plurality of typical trend curves defined in step (b);

(h) selecting a representative typical trend curve defined in step (b) for association with each of said reservoir model cells; and (i) using said typical trend curves selected in step (h) for demonstrating distribution of said trend curves in said reservoir layer.

2. A method in accordance with claim 1, wherein said reservoir property is selected from the group of properties consisting of:

(i) porosity,
   (ii) permeability; and
   (iii) shaliness.

3. A method in accordance with claim 1, wherein said petrophysical model in a nonunique inversion (NUI) model.

4. A method in accordance with claim 1, wherein said seismic data volume comprises a fully migrated 3-D seismic section, and said well log data comprises a wireline well log.

5. A method in accordance with claim 1, wherein said method step of determining said petrophysical model of said reservoir property comprises:

(a) determining an initial petrophysical model, which is representative of measured well log data at said well location;

(b) proposing at least two different petrophysical conditions for a plurality of forward model sites, wherein each one of said forward model sites corresponds to the lithology of a single real seismic trace of said seismic data volume, which trace is thus designated as a characteristic seismic trace for the corresponding forward model site, thereby providing a plurality of said characteristic traces corresponding to said plurality of forward model sites;

(c) proposing at each of said forward model sites:
      (i) at least two pseudo logs for each of said proposed petrophysical conditions, wherein said pseudo logs are expressible as continuous curves of said reservoir property as a function of depth;
      (ii) at least two synthetic seismic traces for each of said at least two pseudo logs, wherein each of said at least two pseudo logs is associated with said at least two synthetic seismic traces, and one of said at least two proposed petrophysical conditions, thereby providing a plurality of synthetic seismic traces and an associated plurality of pseudo logs;

(d) building a catalog comprising said plurality of synthetic seismic traces and said associated plurality of pseudo logs, and storing said catalog in said computer;

(e) selecting a first set of said synthetic seismic traces and an associated first set of pseudo logs from said catalog for association with a first characteristic trace of said plurality of characteristic traces;

(f) selecting one pseudo log from said first set of pseudo logs selected in step (e) for exclusive association with said first characteristic trace, which is thus designated as a prime pseudo log for said first characteristic trace; and (g) repeating steps (e) and (f) for each remaining one of said characteristic seismic traces, thereby providing a plurality of prime pseudo logs; and (h) wherein said plurality of prime pseudo logs selected in step (f) comprises said plurality of model log traces for determining said petrophysical model.

6. A method in accordance with claim 5, wherein said step of selecting said first set of synthetic seismic traces and an associated first set of pseudo logs comprises:
 (a) comparing in said computer each synthetic seismic trace in said catalog to said first characteristic seismic trace;
 (b) selecting said first set of synthetic seismic traces and associated first set of pseudo logs for association with said first characteristic seismic trace based on a numerical measure of the similarity between synthetic traces of said catalog and said first characteristic seismic traces, and wherein said numerical measure includes values for the following factors:
  (i) a cross correlation coefficient;
  (ii) a cross correlation lag;
  (iii) an absolute average difference; and
  (iv) an RB factor; and
 (c) repeating steps (a) and (b) for each remaining one of said characteristic traces.

7. A method in accordance with claim 5, wherein said step of selecting one pseudo log from said first set of pseudo logs comprises:
 (a) comparing in said computer said first set of pseudo logs associated with said first characteristic trace with at least a second set of pseudo logs associated with a second characteristic trace, wherein said first characteristic trace and said second characteristic trace correspond to first and second forward model sites which are adjacent to one another;
 (b) using the comparison made in step (a) for determining a numerical measure of the similarity between each pseudo log in said first set of pseudo logs with corresponding pseudo logs in said second set of pseudo logs;
 (c) selecting said one pseudo log for describing said first forward model site as the pseudo log of said first set of pseudo logs having the highest similarity to a corresponding pseudo log of at least said second set of pseudo logs; and
 (d) repeating steps (a), (b) and (c) for each remaining forward model site.

8. A method in accordance with claim 1, additionally comprising:
 using said typical trend curves selected in step (h) for generating an image display of distribution of said reservoir property.

9. A method in accordance with claim 5, wherein said step of building a catalog of synthetic model traces results in a catalog containing from about 1,000 to about 200,000 synthetic seismic traces.

10. A method in accordance with claim 5, wherein said set of synthetic seismic traces selected for association with said first characteristic trace includes from about 10 synthetic traces to about 50 synthetic traces.

11. Apparatus for converting real seismic traces into a model of flow characteristics within a reservoir layer, wherein a petrophysical model is derived from a basic data set including a three dimensional seismic volume and lithological well log data representative of structure and texture of said reservoir layer for at least one well location within said seismic volume, said apparatus comprising:
 a computer programmed to carry out the following method steps:
 (a) determining said petrophysical model of said reservoir layer, wherein said petrophysical model comprises a plurality of model logs for a reservoir property;
 (b) defining a plurality of typical trend curves of depth versus said reservoir property for said subterranean layer;
 (c) selecting a first plurality of model data points for said reservoir property based on said model logs, wherein said model data points are arranged in rows and laterally extending columns throughout said subterranean layer at spacing corresponding to said seismic data;
 (d) partitioning said model data points into a plurality of reservoir model cells, wherein each of said reservoir model cells traverses said layer and encloses a second plurality of said model data points which is less than said first plurality;
 (e) dividing each of said reservoir model cells into a desired number of horizontal slices, wherein each of said horizontal slices encloses at least two model data points of said second plurality of model data points;
 (f) calculating an average value of said reservoir property in each of said horizontal slices, and plotting said average value versus depth for each of said reservoir model cells to define a derived trend curve for each of said reservoir model cells;
 (g) comparing said derived trend curves of step (f) for each of said reservoir model cells with each of said plurality of typical trend curves defined in step (b);
 (h) selecting a representative typical trend curve defined in step (b) for association with each of said reservoir model cells; and
 (i) using said typical trend curves selected in step (h) for demonstrating distribution of said trend curves in said reservoir layer.

12. Apparatus in accordance with claim 11, wherein said reservoir property is selected from the group of properties consisting of:
 (i) porosity;
 (ii) permeability; and
 (iii) shaliness.

13. Apparatus in accordance with claim 12, wherein said petrophysical model comprises a nonunique inversion (NUI) model.

14. Apparatus in accordance with claim 11, additionally comprising:
 an acoustic source for injecting acoustic signals into the earth;
 means for detecting acoustic reflection signals transmitted back to the surface of the earth by subterranean discontinuities; and
 means for recording said reflection signals.

15. A program storage device, readable by a computer, tangibly embodying a program of instructions executable by said computer for converting real seismic traces and well log data into a model of flow characteristics for a reservoir layer, said method steps comprising:
 (a) determining said petrophysical model of said reservoir layer, wherein said petrophysical model comprises a plurality of model logs for a reservoir property;
 (b) defining a plurality of typical trend curves of depth versus said reservoir property for said subterranean layer;
 (c) selecting a first plurality of model data points for said reservoir property based on said model logs, wherein said model data points are arranged in rows and laterally extending columns throughout said subterranean layer at spacing corresponding to said seismic data;

(d) partitioning said model data points into a plurality of reservoir model cells, wherein each of said reservoir model cells traverses said layer and encloses a second plurality of said model data points which is less than said first plurality;

(e) dividing said reservoir model cells into a desired number of horizontal slices, wherein each of said horizontal slices encloses at least two model data points of said second plurality of model data points;

(f) calculating an average value of said reservoir property in each of said horizontal slices, and plotting said average value versus depth for each of said reservoir model cells to define a derived trend curve for each of said reservoir model cells;

(g) comparing said derived trend curves of step (f) for each of said reservoir model cells with each of said plurality of typical trend curves defined in step (b);

(h) selecting a representative typical trend curve defined in step (b) for association with each of said reservoir model cells; and (i) using said typical trend curves selected in step (h) for demonstrating distribution of said trend curves in said reservoir layer.

16. A program storage device in accordance with claim 15, wherein said reservoir property is selected from the group of properties consisting of:

(i) porosity;

(ii) permeability; and (iii) shaliness.

17. A program storage device in accordance with claim 15, wherein said petrophysical model comprises a nonunique inversion (NUI) model.

18. A program storage device in accordance with claim 15 wherein said method step of determining a petrophysical model of said reservoir comprises:

(a) determining an initial petrophysical model, which is representative of measured well log data at said well location;

(b) proposing at least two different petrophysical conditions for a plurality of forward model sites, wherein each one of said forward model sites corresponds to the lithology of a single real seismic trace of said seismic data volume, which trace is thus designated as a characteristic seismic trace for the corresponding forward model site, thereby providing a plurality of said characteristic traces corresponding to said plurality of forward model sites;

(c) proposing at each of said forward model sites:

(i) at least two pseudo logs for each of said proposed petrophysical conditions, wherein said pseudo logs are expressible as continuous curves of said reservoir property as a function of depth;

(ii) at least two synthetic seismic traces for each of said at least two pseudo logs, wherein each of said at least two pseudo logs is associated with said at least two synthetic seismic traces, and one of said at least two proposed petrophysical conditions, thereby providing a plurality of synthetic seismic traces and an associated plurality of pseudo logs;

(d) building a catalog comprising said plurality of synthetic seismic traces and said associated plurality of pseudo logs, and storing said catalog in said computer;

(e) selecting a first set of said synthetic seismic traces and an associated first set of pseudo logs from said catalog for association with a first characteristic trace of said plurality of characteristic traces;

(f) selecting one pseudo log from said first set of pseudo logs selected in step (e) for exclusive association with said first characteristic trace, which is thus designated as a prime pseudo log for said first characteristic trace; and (g) repeating steps (e) and (f) for each remaining one of said characteristic seismic traces, thereby providing a plurality of prime pseudo logs; and (h) wherein said plurality of prime pseudo logs selected in step (f) comprises said plurality of model log traces for determining said petrophysical model.

19. A method in accordance with claim 1, wherein the distribution of said typical trend curves are assigned corresponding pseudo relative permeability curves within a reservoir simulation model on a cell by cell basis.

* * * * *